United States Patent
Aswood Smith

(10) Patent No.: US 7,412,168 B2
(45) Date of Patent: Aug. 12, 2008

(54) MPLS APPLICATION TO OPTICAL CROSS-CONNECT USING WAVELENGTH AS A LABEL

(75) Inventor: Peter Aswood Smith, Hull (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

(21) Appl. No.: 11/352,797

(22) Filed: Feb. 13, 2006

(65) Prior Publication Data

US 2006/0127089 A1    Jun. 15, 2006

Related U.S. Application Data

(63) Continuation of application No. 09/536,020, filed on Mar. 27, 2000, now Pat. No. 7,031,607.

(60) Provisional application No. 60/204,037, filed on Feb. 22, 2000.

(51) Int. Cl.
*H04J 14/00* (2006.01)

(52) U.S. Cl. .......................................... 398/51; 398/54

(58) Field of Classification Search .................... 398/48, 398/49, 50, 51, 54, 57
See application file for complete search history.

(56) References Cited

U.S. PATENT DOCUMENTS

| | | | | |
|---|---|---|---|---|
| 5,938,309 A * | 8/1999 | Taylor | .......................... | 398/79 |
| 6,160,651 A * | 12/2000 | Chang et al. | .................. | 398/79 |
| 6,363,319 B1 * | 3/2002 | Hsu | ........................... | 701/202 |
| 6,532,088 B1 * | 3/2003 | Dantu et al. | ................... | 398/43 |
| 6,577,418 B1 * | 6/2003 | Boivie | .......................... | 398/48 |
| 6,721,269 B2 * | 4/2004 | Cao et al. | .................... | 370/227 |
| 2002/0091855 A1 * | 7/2002 | Yemini et al. | ................ | 709/238 |

* cited by examiner

*Primary Examiner*—Christina Y Leung
(74) *Attorney, Agent, or Firm*—David A. Dagg

(57) ABSTRACT

A label switching routing protocol for establishing a datapath as a sequence of locally unique labels in an optical communications network, is provided. A wavelength on an optical cross-connect is considered as a label, or one portion of a label. Timeslots may be assigned to designated wavelengths so as to form the second portion of a composite label. An optical/time cross-connect (OTXC) capable of wavelength conversion from an input to an output interface creates the datapath based on wavelength to wavelength substitution, under the control of a multi-protocol label switching (MPLS) protocol.

9 Claims, 5 Drawing Sheets

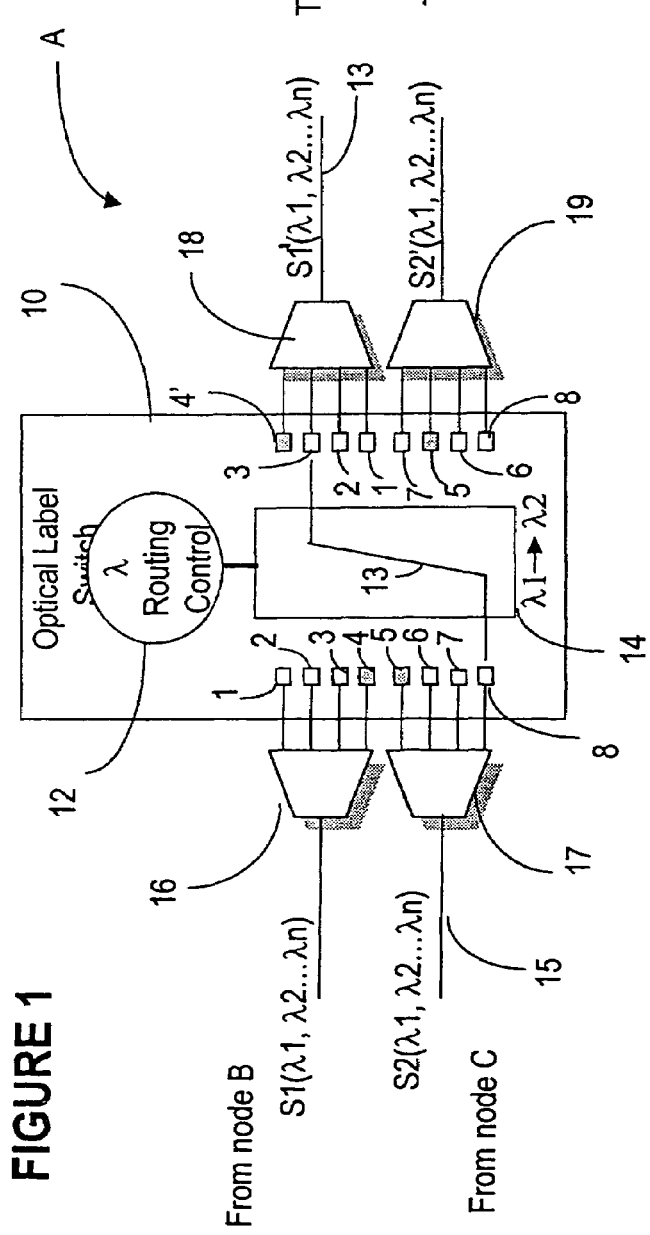
FIGURE 1
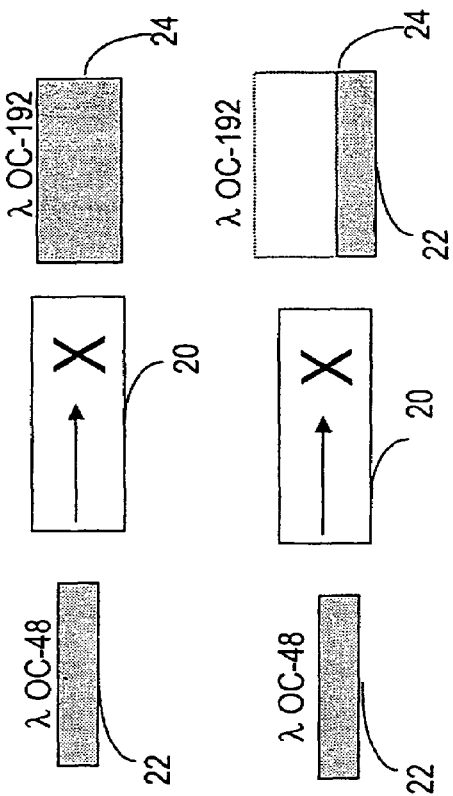
FIGURE 2a
FIGURE 2b

MPLS APPLICATION TO OPTICAL CROSS-CONNECT USING WAVELENGTH AS A LABEL

CROSS-REFERENCE TO RELATED APPLICATIONS

The present application is a Continuation application under 35 U.S.C. 120 of commonly owned prior application Ser. No. 09/536,020, filed Mar. 27, 2000 now U.S. Pat. No. 7,031,607 in the name of Peter Ashwood-Smith, now allowed, and claims priority under 35 U.S.C. 119 to Canadian patent application Ser. No. 2299038, filed on Feb. 21, 2000, entitled "MPLS Application to Optical Cross Connect Using Wavelength As A Label" by Peter Ashwood-Smith, and claims priority under 35 U.S.C. 119(e) to provisional U.S. application Ser. No. 60/204,037, filed Feb. 22, 2000.

BACKGROUND OF THE INVENTION

1. Field of Invention

The present invention relates generally to optical communications systems and particularly to label distribution protocols in an optical transmission system using wavelength division multiplexing (WDM).

2. Related Art

Current optical networks allow high bandwidth data communications. The transport capacity required to accommodate the growth of communications traffic is provided by optical links using wavelength division multiplexing (WDM) or dense wavelength division multiplexing (DWDM) having increased capacity and longer reach. High speed data can be modulated on light waves and transmitted through the optical network. Wavelength division multiplexing (WDM) is a technique for modulating electrical data signals carrying the information of interest on distinct light wave carriers (or channels) having different wavelengths.

D/WDM networks use signaling and routing protocols for rapidly setting up end-to-end connections. Optical cross-connects (OXC) are used in D/WDM networks as a platform for functional integration and network management. OXCs using wavelength routing and signaling protocols are considered fast wavelength switches having more stringent speed, timing and control requirements compared to conventional OXCs, allowing fast end-to-end connectivity. However, current OXC's are in fact hybrid network elements, in that conversion to the electrical domain is necessary.

In theory, a wavelength can be used end-to-end (from source to, destination) across the optical network. However, in practice, to achieve long reach and to avoid wavelength blocking, a wavelength may change through wavelength translation (or conversion). Not all OXC's are capable of wavelength conversion. Optical switches technology (photonic switches) emerge in the transport network. A photonic switch must be able to effect add/drop and switching in the optical domain, routing the signal from the input to output ports entirely in the optical domain.

Another requirement for DWDM networks is to respond quickly to unpredictable traffic intensities and patterns. The Optical Internet is developing towards the optical layer eventually being directly responsive to the IP service layer according to changing traffic situations. To achieve a unified packet and optical switched network architecture, standard routing and signaling protocols may be adapted to the specific requirements of the wavelength routed networks. Known standard signaling and routing protocols are OSPF (open shortest path first), IS-IS (intermediate system-intermediate system), PNNI (private network-network interface), and MPLS/LDP (multi-protocol label switching/label distribution protocol). The signaling system seven (SS7) used in voice networks may also be considered.

The multi-protocol label switching (MPLS) is a network technology intended to deliver traffic engineering capability and QoS (quality of service) performance for carrier networks to support differentiated services. MPLS is currently used with the asynchronous transmission mode (ATM). Examples of labels used with various protocols are DLCI (data link connection identifier) label that travels with the frame relay protocol, "timeslot" for the time division multiplexing (TDM) protocol, or logical channel number (LCN) for X25 protocol.

MPLS can deliver control and performance to IP packets through the use of label switched paths (LSPs), by combining label-swapping with network layer (layer-3) routing. The labels effectively define the LSP in the MPLS domain to carry the packets. The basic idea is to assign short fixed labels to packets at the ingress to an MPLS domain. A major component of the MPLS is the IP routing protocol (OSPF, BGF) that runs on all MPLS capable nodes, at the edge and the core of label switch routers (LSR's).

Other protocols of the MPLS are IP forwarding at the edge LSRs, and label forwarding at interior LSR's. In the MPLS domain, the labels are used to make forwarding decisions, without use of the packet header. Connectivity is captured in the routing database by the routing protocols, while link local labels are assigned for each route, or aggregates of routes for each hop.

The label switched path (LSP) can be manipulated and managed by the network administrator to direct the traffic. The route for a given LSP can be established in two ways: control driven (also called hop-by-hop LSP), or explicitly routed (ER-LSP). Another way for routing an end-to-end routing in a communications network is broadcasting. Broadcasting data packets implies sending a message from a source node to all nodes in the network, without providing directions. This type of routing however is not considered here.

When setting up a hop-by-hop LSP, each label switch router (LSR) determines the next interface to route the LSP based on its layer-3 routing topology database, and sends the label request to the layer-3 next hop. The label information is distributed by a label distribution protocol (LDP).

When setting up ER-LSP, the route for the LSP is specified in the set-up message itself, and this route information is carried along the nodes the set-up message traverses. All the nodes along the ER-LSP will follow the route specification and send the label request to the next indicated interface. In this case, the label information is distributed by a constraint-based routing CR-LDP, which is an extension of the LDP by including an explicit path. The CR-LDP is an efficient solution for core network traffic engineering as regarding the quality of service (QoS) guarantees, path optimization, and flexibility.

While the hop-by-hop LSP follows the path that normal layer-3 routed packets will take, the ER-LSP can be specified and controlled by network operators or network management applications to direct the network traffic, independent of the layer-3 topology.

CR-LDP signaling builds on the existing LDP protocol and provides ER-LSP set-up with optional resource reservation in a simple hard state control and messaging manner. The LDP mechanism by which LSP are created is the same for both hop-by-hop and explicit routes (UDP for peer discovery and TCP for session, advertisement and messaging). The basic LDP protocol is extended to incorporate the explicit route information, the traffic parameters for resource reservation, and the necessary options for ER-LSP reliability and resiliency. An explicit route is represented in a label request message as a list of nodes or group of nodes along the constraint-based route. If the requested path can satisfy the resource required, labels are allocated downstream and distributed by means of label mapping messages.

Using the above techniques, one can imagine sending a messenger ahead of the traffic to reserve capacity for the transmitted data, and for distributing instructions at each node indicating where the packet has to go.

SUMMARY OF THE INVENTION

It is an object of the present invention to provide optical label switching (OLS) for IP traffic.

Another object of the invention is to provide a routing protocol to control layer 1 and layer 2 hardware in an MPLS-enabled IP network.

It is another object of the present invention to broaden the MPLS lambda ($\lambda$) switching optical scope to additionally address the SONET hierarchy by making the constrained routing LDP (CR-LDP) a common connection oriented signaling protocol for time, frequency, and statistically multiplexed paths.

Still another object of the present invention is to apply an MPLS-like approach to the optical switch to create an optical label switch where $\lambda$ represents the label, or a portion of the label to be distributed.

According to one aspect of the invention, a label substitution routing protocol for establishing a datapath as a sequence of locally unique labels in an optical communications network, wherein each label is a wavelength frequency, is provided. The wavelength may constitute a label, or one portion of a label, while the second portion is formed by assigned timeslots.

According to another aspect of the invention, an optical cross-connect (OXC) for creating a datapath in an optical communications network, is provided. The OXC is capable of wavelength conversion so as to provide wavelength to wavelength substitution along the datapath, under the control of a MPLS protocol.

Advantageously, the invention allows one routing protocol to control layer 1 and layer 2 hardware, and this greatly simplifies the network. It brings Us constrained based routing to the optical and time domains, where it previously existed only in the statistical domain.

The "Summary of the Invention" does not necessarily disclose all the essential features for defining the invention which may reside in sub-combinations of the disclosed features.

BRIEF DESCRIPTION OF THE DRAWINGS

The invention will be now explained by way of example only and with reference to the following drawings.

FIG. 1 illustrates the an optical label switch according to the invention;

FIGS. 2a and 2b illustrate examples of cross-connecting two optical paths having different transmission speeds (prior art);

Similar references are used throughout the description to denote similar parts.

DESCRIPTION OF THE PREFERRED EMBODIMENTS

Figure 3:
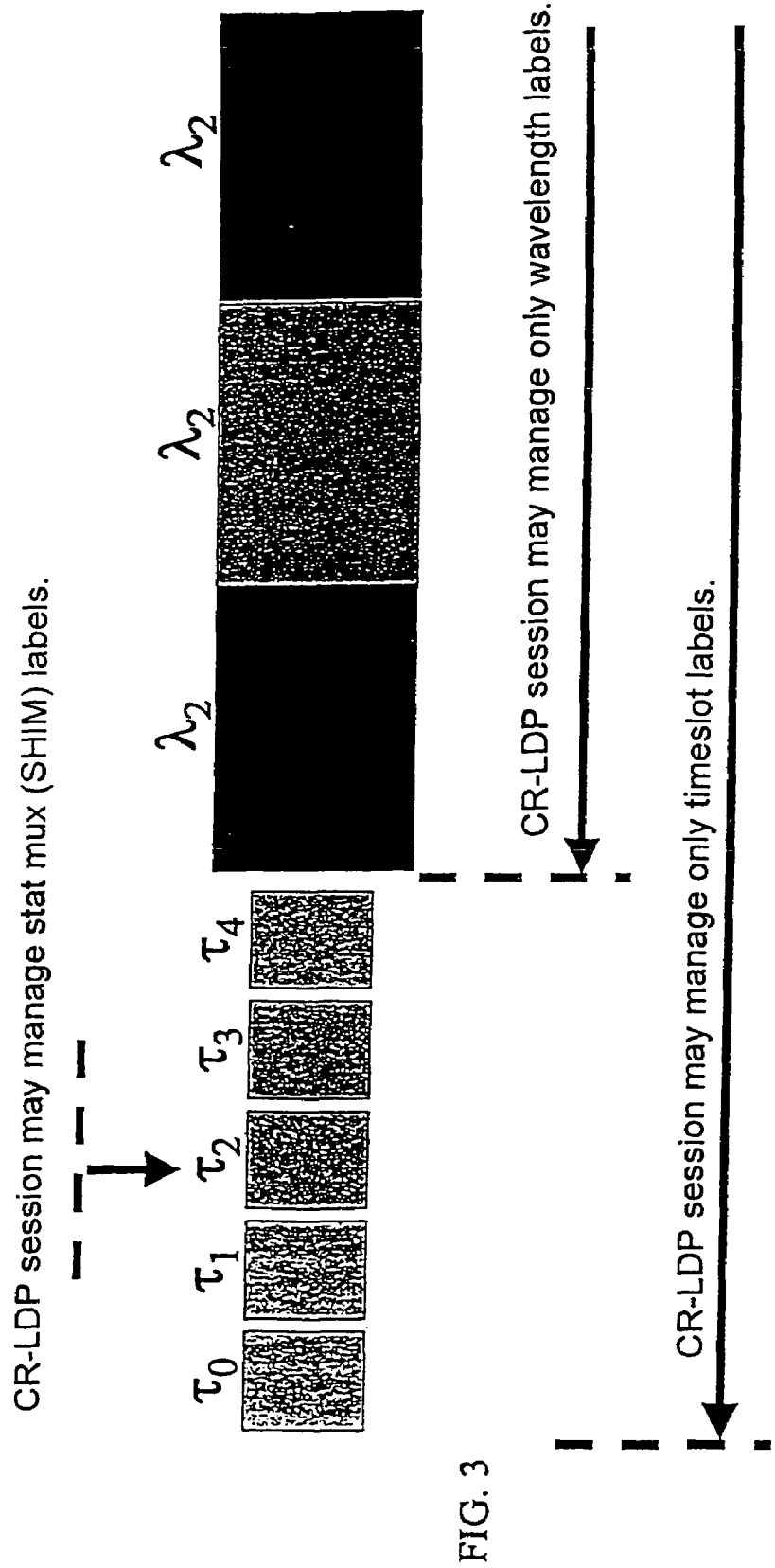
FIG. 3 illustrates the principle of control of an optical/time label switch.

Throughout the description the CR-LDP protocol is used as an example and it is understood that any other protocol which can support ER-LSPs can be considered. Also, the description refers to SONET/SDH signals, but the invention is also applicable to other transport protocols.

The MPLS is used herein as a signaling protocol defined to setup, maintain, and release wavelength paths in an optical network. The term "path" in the context of the transport network is used in this specification to define a set of consecutive links connecting two end nodes. "End-to-end" refers to a path between a source and a destination router for a certain packet.

The main function of the optical MPLS protocol according to the invention is connection management by wavelength grouping and mapping, or label banding, according to combinations of destination addresses, and type of service (ToS) information. The ToS information may be provided according to optical FEC (Forwarding Equivalence Classes) and distributed with the label banding. The MPLS protocol can also create various types of connections, one being the explicit routed (ER) path as defined in the CR-LDP.

FIG. 1 illustrates a node A of a transport network equipped, among others, with an optical label switch according to the invention. An optical label switch 10 comprises a $\lambda$ routing control entity 12 and the photonic fabric 14 for connecting the input and output ports under control of entity 12. The node is also provided with demultiplexers 16 and 17, which demultiplex the incoming multichannel signals S1 and S2 into component channels at the input side of the switch 10. Signals S1 and S2 arrive at node A for example from nodes B and C, respectively. Multichannel signals S1 and S2 have each channels $\lambda 1$-$\lambda n$ in this example, but it is to be understood that the number and the wavelengths of the channels in S1 and S2 may be different. FIG. 1 shows intuitively that each channels has a unique label 1-4 for S1 and 5-8 for S2, but more (than "n" in this example) or less labels may be used, depending on the application.

At the output side of switch 10, multiplexers 18 and 19 combine the channels into the output signals S1' and S2', according to their destination. Namely, the channels traveling on the output span towards a node D are grouped into S1', while the channels traveling towards node E are grouped into S2'.

Switch fabric 14 effects the label switching under control of entity 12. The example of FIG. 1 shows four channel signals S1 and S2 and only four labels for simplification. In fact, there will be a different label for each wavelength. For the same reason, this example shows S1 and S2 having the same number of channels. Suppose that $\lambda 1$ arriving on line 15 is to be frequency switched to $\lambda 2$ on line 13. The frequency to frequency switching is necessary when for example, the rates of the channel input and output at switch 10 are different, as it will be discussed later in connection with FIGS. 2a and 2b. For routing purposes, λ1 is switched to λ2 using the frequency as a label for the MPLS protocol to distribute across the network.

It is to be noted that λ may constitute the entire label or just a portion of the label. No new protocols are needed for further routing as the LDP protocol is used to setup OSPF routes, and the CR-LDP protocol can engineer the traffic.

FIGS. 2a and 2b illustrate problem occurring in current cross-connects when switching two optical paths having different transmission rates. An OXC is typically a slow provisioned wavelength switch with optical interfaces connected at typically SONET optical carriers (OCs), and a switch fabric (core) that could be electrical or optical.

FIG. 2a illustrates an OXC 20 receiving a lower rate input channel and transmitting a high rate output signal. It is to be noted that having all optical paths running at the same speed is not possible as physical media differences may dictate lower speeds on certain links. However, the conventional OXC 20 can not cross-connect line 22 which is an OC-48 to line 24 which is an OC-192 unless the connection is performed at the lowest supported rate, here at OC-48. As shown, in FIG. 2b, optical cross-connect (OXC) 20 can only connect two transmission lines having same transmission speed like for example optical carriers (OC-48) 22. This wastes 3×OC-48 or 7.5 Gb/S for the example of FIG. 2b, which is an enormous amount of bandwidth.

FIG. 3 illustrates the principle of control of an optical/time label switch. The switch operates based on a-wavelength (λ) and time (T) label, managed by the CR-LDP/RSVP protocol. The labels are considered in a hierarchy with the lambda (λ) labels on top of the timeslot (T) labels, which in turn are hierarchically above the statistically multiplexed (shim) labels.

The CR-LDP/RSVP protocol sessions may manage each level of the hierarchy independently. By creating a composite label according to the invention, one session is used instead of two or more sessions per each level of hierarchy. It is also assumed that an Internet protocol (IP) like point to point protocol (PPP) or transport communications protocol (TCP) channel is available for CR-LDP/TCP/IP.

Figure 4:
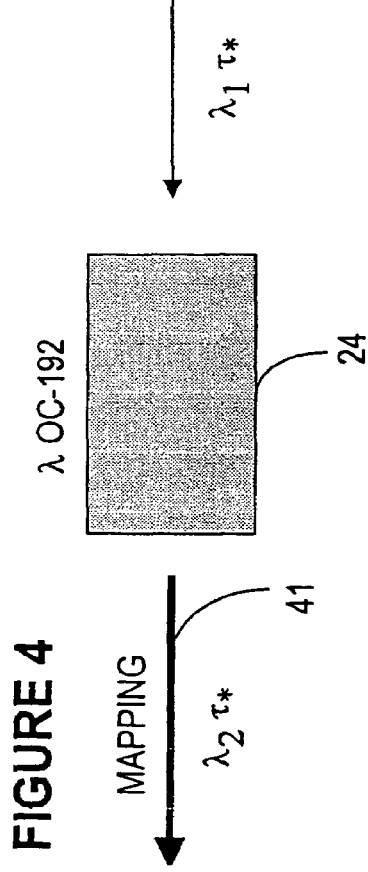
FIG. 4 shows the symbol for a composite label mapping message.

FIG. 4 illustrates the symbol for a composite label mapping message, shown by an East-West arrow 41 and the word 'mapping' for distinguishing the direction of propagation from that of the traffic. The composite label comprises in this example a wavelength ($\lambda_n$) and a set of timeslots ($T_{k-p}$) forming a single composite label ($\lambda_n$; $T_{k-p}$). In the following, the interface shown to the right of switch 10 in FIG. 1 is designated by term East, and the interface to the left of switch 10 is designated by term West. It is to be understood that these are relative terms, for easy simplifying the definition and description of the invention. It is also to be understood that the West interface may for example be the input interface for the traffic (input traffic IF) traveling from West to East, and the output interface for the corresponding label mapping message (output label IF). Similarly, the East interface may be the input-traffic IF for the traffic traveling from East to West, and the input label IF for the corresponding label mapping message.

At the optical label switch, the MPLS protocol establishes a sequence of locally unique labels, and programms the switch such that the label on an input traffic interface is switched to another label on an output traffic interface. Then, the label mapping message is sent back to the source node A. The invention proposes the wavelength on optical cross-connect to be considered a label and therefore, any optical cross-connect capable of wavelength conversion from an West to an East interface can be controlled by the MPLS protocol. Thus, according to the invention, an MPLS datapath being wavelength to wavelength substitution is created. The optical cross-connect also includes time division multiplexing equipment for providing statistical multiplexing, frequency division multiplexing, and time division multiplexing under the control of same MPLS protocol.

Figure 5:
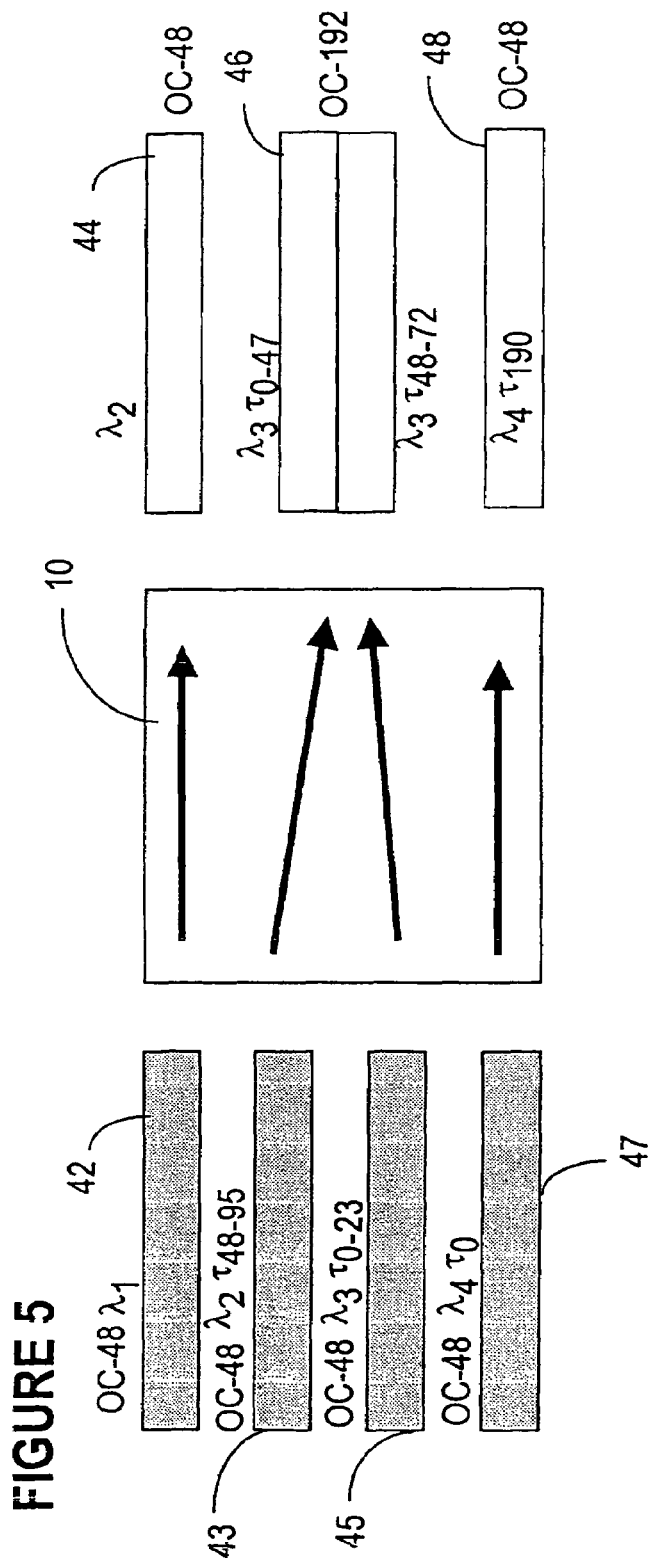
FIG. 5 illustrates the operation of an optical time cross-connect (OTXC) according to the invention.

FIG. 5 illustrates the operation of an optical label switch, also called an optical/time cross-connect (OTXC), according to the invention. Switch OTXC 10, receives four wavelengths ($\lambda_1 \ldots \lambda_4$) on OC-48 carriers, and three output channels $\lambda_2$ on OC-48, $\lambda_3$ on OC-192. and $\lambda_4$ on OC-48. The optical/time (OTXC) switch 10 performs pure optical cross-connect by mapping $\lambda_1$ received on link 42 to $\lambda_2$ on link 44. This operation involves switching of the traffic arriving on input channel $\lambda_1$ to the output channel $\lambda_2$, as the two links 42 and 44 have the same rate.

Where the rates of the input and output channels do not match, the CR-LDP protocol performs electrical/time sub-wavelength switching, so that the traffic on input channels $\lambda_2$ and $\lambda_3$ received over links 43 and 45 at OC-48, are transmitted over the output channel $\lambda_3$ at an OC-192 over link 46.

In this case, two composite labels flowing East to West are generated at switch 10, to indicate to the previous nodes that the channels on links 43 and 45 were combined, and to also indicate the way the channels were combined. The label of the wavelength on link 46 include $\lambda_3$ and variable size timeslots ($T_{0-47}$) and ($T_{48-72}$) are assigned forming a second portion of the label in this case. This indicates that the first 48 time-slots of the output OC-192 on link 46 were allocated to the traffic received on input $\lambda_2$, timeslots 48-95, and the next 24 timeslots (timeslots 48 to 72) were allocated to the input $\lambda_3$, timeslots 0-23.

If the label of the incoming signal comprises a wavelength and a timeslot (TO), as for example composite label ($\lambda_4$; TO) shown on line 47, the connection is performed for example, by maintaining the same wavelength and eventually assigning it another timeslot, e.g. $T_{190}$.

Figure 6:
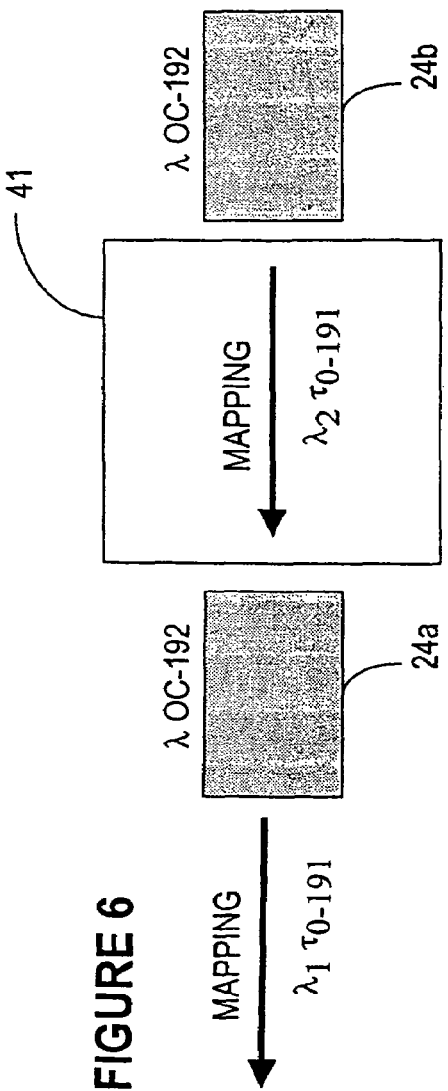
FIG. 6 illustrates by way for example the operation of an OTXC when the output and input rates and framing are the same.

FIG. 6 illustrates by way of example the operation of OTXC 10 when the output and input rates and framing of the switched signal are the same. The example illustrates an OC-192 frame 24a at the input of the switch 10 and an OC-192 frame 24b at the output of the switch 10. In this case, the switch could be pure optical, performing frequency to frequency conversion from $\lambda_1$ to $\lambda_2$, where the timeslots of the input signal correspond to the timeslots of the output signal. The label in this case is ($\lambda_1$; $T_{0-191}$) before conversion and ($\lambda_2$; $T_{0-191}$) after conversion.

Figure 7:
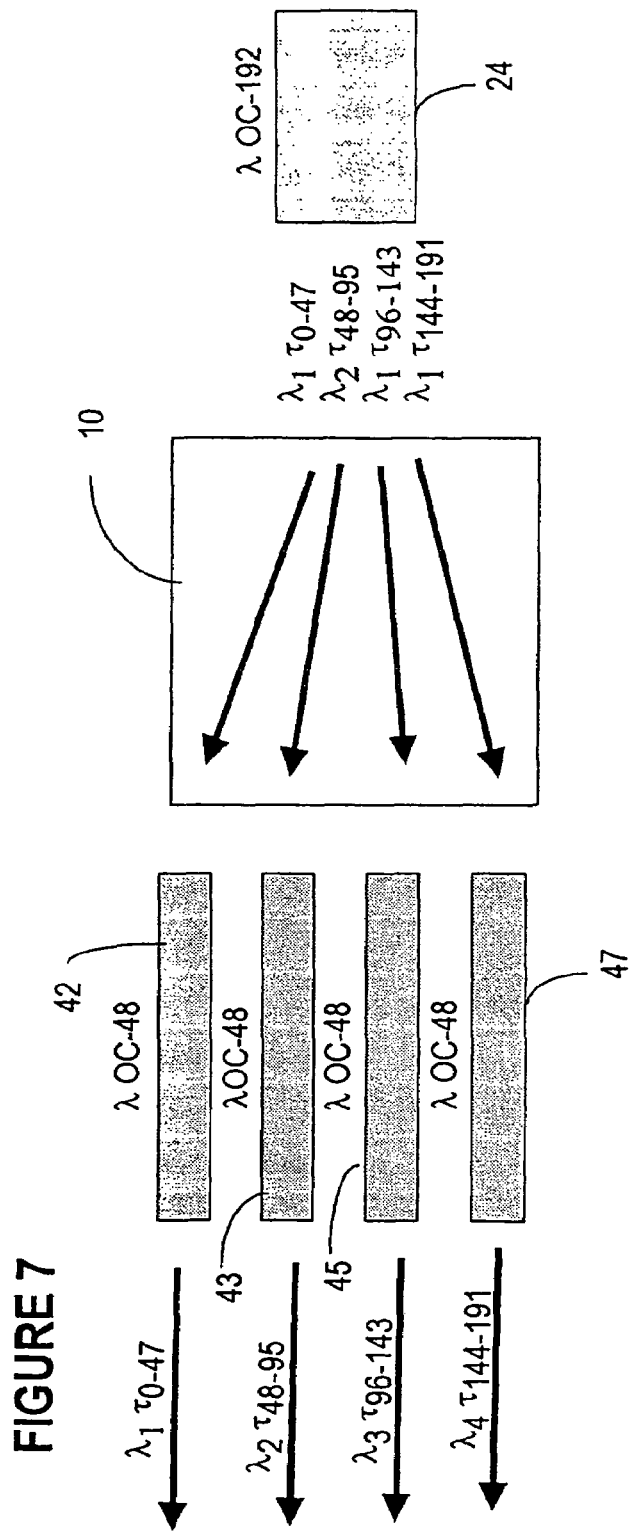
FIG. 7 illustrates by way of example the operation of the OTXC when the output rate is higher than the input rate.

FIG. 7 illustrates another example of operation of the optical label switch (OTXC) 10 when the output rate on link 24 is higher (OC-192) than the input rate (OC-48) on links 42, 43, 45, and 47, assuming SONET framing. A subset of timeslots 0-47 are assigned on output link 24 for $\lambda_1$ received on input 42, timeslots 48-95 are assigned for $\lambda_2$, timeslots 96-143 are assigned for $\lambda_3$, and timeslots 144-192 are assigned $\lambda_4$. The switch generates a composite label mapping message for each OC-48, each including the respective wavelength $\lambda_1$ to $\lambda_4$, and the same assigned timeslots $T_{0-47}$.

Figure 8:
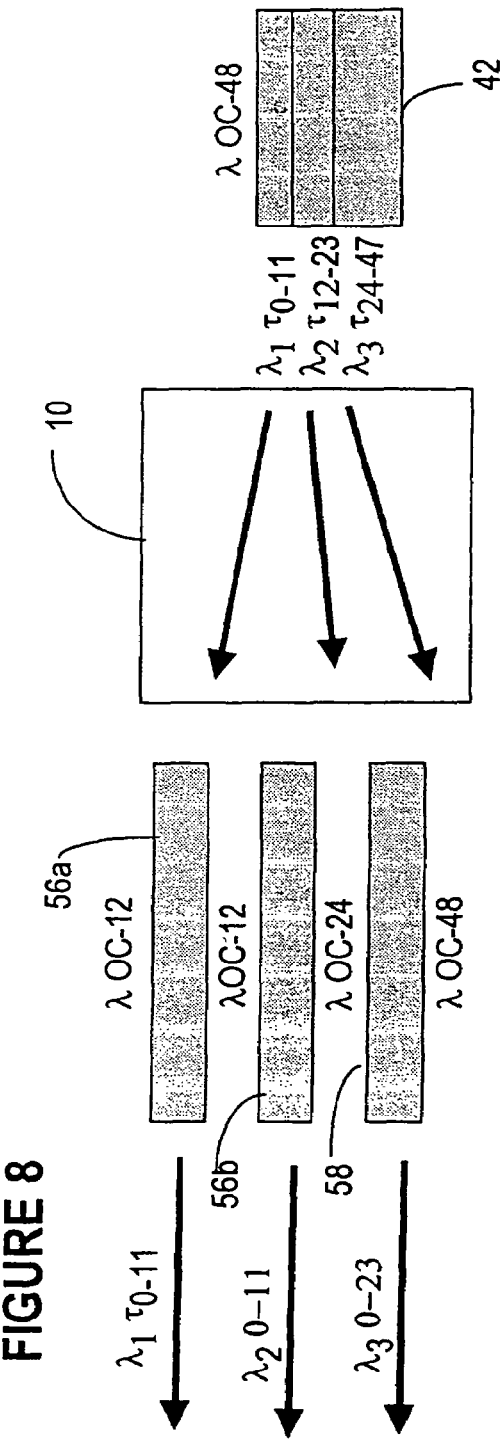
FIG. 8 illustrates another example of operation of an OTXC when the output rate is higher than the input rate.

FIG. 8 illustrates another example of operation of an optical label switch (OTXC) 10 when the input rates are unequal and less than the output rate. In this example the input channels $\lambda_1$ and $\lambda_2$ at an OC-12 rate are received on links 56a, 56b, and the input channel $\lambda_3$ at an OC-42 rate is received on links 56c. The traffic carried by these channels is switched onto an output channel $\lambda_1$ at an OC-48 rate. The optical label switch (OTXC) 10 generates three composite label mapping messages for each of the input channels; indicating the wavelength of the respective channel and the timeslots allocated to the incoming traffic into the transmitted OC-48. The traffic from wavelength $\lambda_1$ is switched into timeslots 0-11 of the OC-48, and the label mapping message sent on link 56*a* is ($\lambda_1$; $T_{0-11}$). The traffic from wavelength $\lambda_2$ is switched into timeslots 12-23 of the OC-48, and the label on link 56*b* is ($\lambda_2$; $T_{0-11}$). Finally, the traffic from wavelength $\lambda_3$ is switched into timeslots 23-47 of the OC-48, and the label on link 58 is ($\lambda_3$; $T_{0-23}$).

Figure 9:
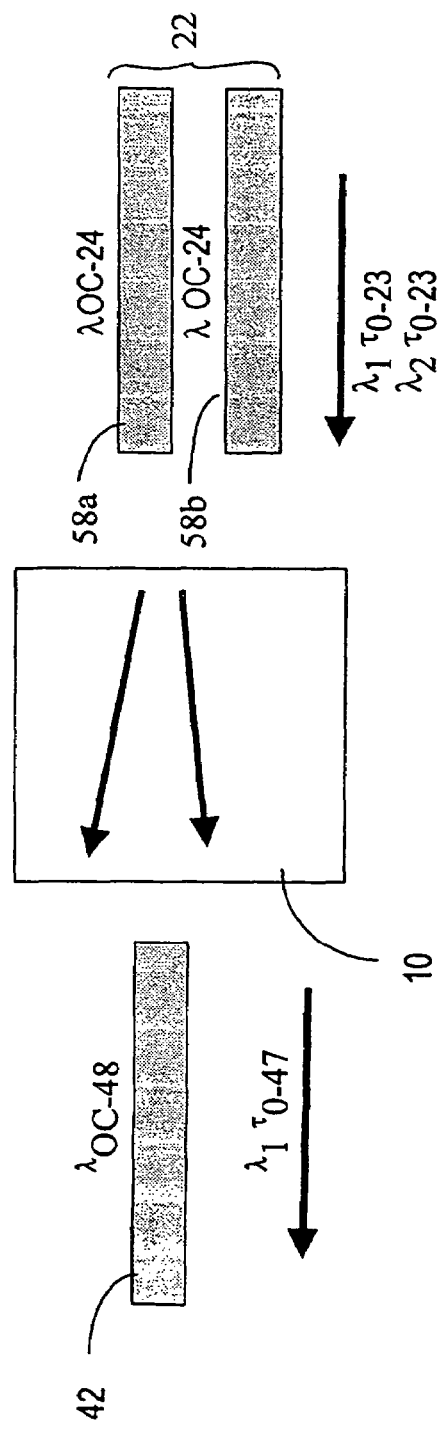
FIG. 9 illustrates by way of example the operation of the OTXC when the output rate is less than the input rate.

FIG. 9 illustrates by way of example the operation of the optical label switch (OTXC) 10 when the output rate is less than the input rate. Here, two output channels $\lambda_1$, $\lambda_2$, each carrying an OC-24 of traffic on link 58*a* and 58*b*, respectively, are required to carry an input channel $\lambda$1 at OC-48 received on link 22. Suppose composite labels ($\lambda_1$, $T_{0-23}$) and ($\lambda_2$, $T_{0-23}$) arrive on links 58*a* and 58*b* at switch 10. In such a situation, multiple wavelengths/timeslots must be allocated to the output channel on links 58*a* and 58*b*. As shown in FIG. 9, the first timeslots 0-23 of the input OC-48 received on link 22 are switched into the output channel $\lambda_1$ on link 58*a*, while the last timeslots 24-48 of the input OC-48 are switched into the output channel $\lambda_2$ on link 58*b*. Switch 10 generates a composite label mapping message for ($\lambda_1$, $\lambda_2$; $T_{0-23}$) into one outgoing composite label ($\lambda_1$; $T_{0-47}$).

As shown and described in the above examples, the routing protocol using the wavelength as a label according to the invention, provides a datapath as a sequence of locally unique labels which include wavelength information for the respective channel, and, when necessary, address (timeslot) information of the traffic in the frame. The wavelength on an optical cross-connect is considered as a label or a portion of a label. Timeslots are assigned to designated wavelengths so as to form the second portion of the label. Time division multiplexing equipment providing statistical multiplexing, or time division multiplexing, or frequency division multiplexing, can also be programmed and controlled by the MPLS protocol. This greatly simplifies the network by bringing constraint-based routing to the optical and the time domain, thus making one protocol available for many layers of the network.

Numerous modifications, variations, and adaptations may be made to the particular examples of the invention without departing from the scope of the intention which is defined in the claims.

The invention claimed is:

1. A label switching method for multi-protocol label switching (MPLS) optical communications network, comprising:
    defining a datapath between a source node and a sink node, the datapath being represented as a sequence of labels, each label identifying a portion of the datapath between a pair of nodes in the datapath, and each label also containing a value of a communication attribute of the portion of the datapath identified by the label;
    wherein a wavelength field in each label contains the value of the communication attribute for the portion of the datapath identified by the label; and
    wherein the value of the communication attribute comprises a time value indicating one of a plurality of timeslots to be used for communication over the portion of the datapath identified by the label.

2. The method of claim 1, wherein the plurality of timeslots are of variable size.

3. The method of claim 1, wherein the defining of the datapath is responsive to a multi-protocol label switching (MPLS) protocol.

4. The method of claim 3, wherein the defining of the datapath is further responsive to a constrained routing label distribution protocol (CR-LDP).

5. A network communication system comprising a source node and a sink node coupled by an intermediate node, the network communications system comprising:
    a routing control entity for defining a datapath between the source node and the sink node, the datapath being represented as a sequence of labels, each label identifying a portion of the datapath between a pair of nodes in the datapath, and each label also containing a value of a communication attribute of the portion of the datapath identified by the label;
    wherein a wavelength field in each label contains the value of the communication attribute for the portion of the datapath identified by the label; and
    wherein the value of the communication attribute comprises a time value indicating one of a plurality of timeslots to be used for communication over the portion of the datapath identified by the label.

6. The network communication system of claim 5, wherein the plurality of timeslots are of variable size.

7. The network communication system of claim 5, wherein the defining of the datapath by the routing control entity is responsive to a multi-protocol label switching (MPLS) protocol.

8. The network communication system of claim 7, wherein the defining of the datapath by the routing control entity is further responsive to a constrained routing label distribution protocol (CR-LDP).

9. A network communication system comprising a source node and a sink node coupled by an intermediate node, the network communications system comprising:
    means for defining a datapath between the source node and the sink node, the datapath being represented as a sequence of labels, each label identifying a portion of the datapath between a pair of nodes in the datapath, and each label also containing a value of a communication attribute of the portion of the datapath identified by the label, wherein a wavelength field in each label contains the value of the communication attribute for the portion of the datapath identified by the label, and wherein the value of the communication attribute comprises a time value indicating one of a plurality of timeslots to be used for communication over the portion of the datapath identified by the label.

* * * * *